July 29, 1930.  J. BERGE  1,771,522
THREAD PROTECTING CLOSURE
Filed Dec. 12, 1925
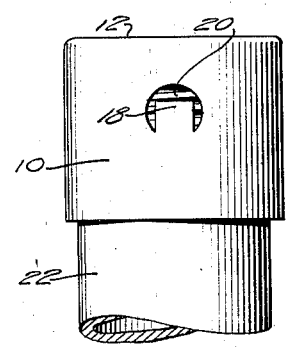
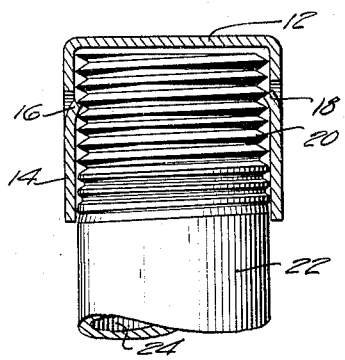
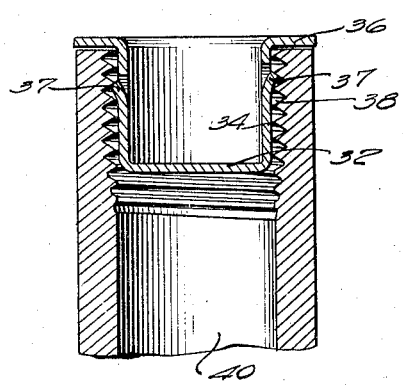
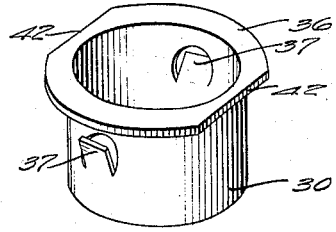
INVENTOR
Joseph Berge
BY
H. H. Dyke
ATTORNEY Patented July 29, 1930

1,771,522

UNITED STATES PATENT OFFICE

JOSEPH BERGE, OF MONTCLAIR, NEW JERSEY

THREAD-PROTECTING CLOSURE

Application filed December 12, 1925. Serial No. 75,105.

My invention is of a thread protecting closure for threaded pipes, pipe fittings and the like, and will be best understood from the following description of certain embodiments of the invention.

In the accompanying drawings, Fig. 1 is a side view of a thread protecting cup in place on an externally threaded pipe. Fig. 2 is a view similar to Fig. 1, but showing the thread protecting closure in section. Fig. 3 is a perspective view of a thread protecting cup for use with internally threaded members, such as pipe fittings, for example. Fig. 4 is a sectional view of the cup of Fig. 3 in place in an internally threaded member, such as a pipe fitting, radiator, or the like.

The cup 10 of Figs. 1 and 2 is preferably drawn or pressed from sheet material, such as sheet metal, and comprises a closure part 12 and the side wall part 14. Tongues 16, 18 extend inwardly from the side walls, as by being formed from the sheet metal cup itself. These tongues are preferably sufficiently resilient to spring back under the threads 20 when the protector is pushed over the end of the pipe 22, and are preferably arranged in substantially the pitch relation of the threads. With such arrangement the application may be completed by turning the cup after it is pushed on longitudinally, thereby locking it in place, the disk portion 12 serving as a stop to the thrusting and screwing movement upon application of the cup. The disk or closure part 12 also serves to protect the end of the pipe and in addition serves to exclude grit and the like from the bore 24. Cup 10 can be removed by turning or screwing it in the reverse direction, or the tongues 16, 18 may be pried up and the cup slipped off.

The cup 30 of Figs. 3 and 4 embodies the same principal features. It comprises the disk or closure part 32, the body walls 34 and the laterally projecting flange 36. Body wall portion 34 is provided with tongues 37 which extend outwardly to make resilient engagement with the internal threads 38 of a member, such as a pipe coupling or the like 40. When cup 30 is pushed into the internally threaded bore and screwed home, the flange 36 serves as a stop means for limiting the inward movement of cup 30 and for protecting the end of the fitting or the entrance to the threaded opening from injury, and the disk or closure part 32 serves only the function of providing a closure to exclude access of foreign material. Flange 36 may be made flat on each side, as shown at 42, for convenient application of a wrench, as in tightening up or removal of the protecting cup 30.

Thread protecting closures in accordance with my invention can be made very simply and inexpensively. The externally applied type is very useful in protecting the threads and the ends of the pipes, spark plugs, etc., from injury and in excluding foreign matter from the bore, and is also well adapted for protecting externally threaded parts, such as rod ends, screw machine parts, collets and the like.

The internal type is also useful for plugging up tapped holes in hollow castings, such as steam radiators, internal combustion cylinder heads, etc., during shipment and storage.

I claim:

A closure for protecting the threaded end portions of tubes comprising a seamless cup-shaped member of integral sheet metal including an annular portion adapted to enclose said threaded portion, and tongues integral with said annular portion projecting beyond the same, and having end edges constituting partial threads adapted to engage the threads of the tube; the openings in said annular portion about said tongues being enlarged relative thereto to provide clearances between the edges of said openings and the edges of said tongues for the reception of a tool; and said member including a transverse portion serving to completely close said annular portion at an end thereof, and the tube against access of foreign material thereto, and to limit the movement of said closure inwardly on said tube.

In testimony whereof, I have signed my name hereto.

JOSEPH BERGE.